US006547117B2

(12) United States Patent
Glovatsky et al.

(10) Patent No.: US 6,547,117 B2
(45) Date of Patent: Apr. 15, 2003

(54) CONTAINER HOLDER THAT UTILIZES MOLDLINE STRUCTURES

(75) Inventors: Andrew Zachary Glovatsky, Plymouth, MI (US); Robert Edward Belke, West Bloomfield, MI (US); Jay DeAvis Baker, Dearborn, MI (US); Joseph Mario Giachino, Farmington Hills, MI (US); Lakhi Nandlal Goenka, Ann Arbor, MI (US); Myron Lemecha, Dearborn, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/904,346

(22) Filed: Jul. 12, 2001

(65) Prior Publication Data

US 2002/0008127 A1 Jan. 24, 2002

Related U.S. Application Data

(60) Provisional application No. 60/218,493, filed on Jul. 14, 2000.

(51) Int. Cl.$^7$ ................................................ B60R 7/00
(52) U.S. Cl. ..................................... 224/539; 224/926
(58) Field of Search ............................. 224/539, 545, 224/548, 552, 556, 563, 567, 571, 572, 926; 248/311.2; 244/133; 16/225

(56) References Cited

U.S. PATENT DOCUMENTS

| 4,280,753 A | 7/1981 | Neubauer |
| 4,575,200 A | 3/1986 | Humiston |
| 5,222,200 A | 6/1993 | Adler |
| 5,222,699 A | 6/1993 | Albach et al. |
| 5,639,065 A | 6/1997 | Lin |
| 5,692,585 A | 12/1997 | Kazuro et al. |
| 5,713,557 A | 2/1998 | Kang |
| 5,810,291 A | 9/1998 | Geiger et al. |
| 5,913,494 A | 6/1999 | Burbridge et al. |
| 5,918,834 A | 7/1999 | Sommer et al. |
| 5,927,651 A | 7/1999 | Geders et al. |
| 5,931,422 A | 8/1999 | Geiger et al. |
| 5,941,480 A | 8/1999 | Wille |
| 5,947,417 A | 9/1999 | Cameron |
| 5,947,422 A | 9/1999 | Wille |
| 5,958,803 A | 9/1999 | Geiger |
| 5,975,463 A | 11/1999 | Gruensfelder et al. |
| 5,988,567 A | 11/1999 | Wille |
| 6,027,074 A | 2/2000 | Cameron et al. |
| 6,048,581 A | 4/2000 | Waldrop, III |
| 6,053,477 A | 4/2000 | Price |
| 6,068,215 A | 5/2000 | Gruensfelder et al. |
| 6,076,766 A | 6/2000 | Gruensfelder |
| 6,089,505 A | 7/2000 | Gruensfelder et al. |
| 6,092,764 A | 7/2000 | Geders et al. |
| 6,142,501 A | 11/2000 | Fogo et al. |
| 6,193,025 B1 | 2/2001 | Nakagawa |
| 6,213,572 B1 | 4/2001 | Linkner, Jr. et al. |
| 6,230,949 B1 | 5/2001 | O'Connell et al. |
| 6,234,284 B1 | 5/2001 | Ashman et al. |
| 6,234,585 B1 | 5/2001 | Harris et al. |

Primary Examiner—Stephen K. Cronin
Assistant Examiner—Maerena W. Brevard
(74) Attorney, Agent, or Firm—Brinks Hofer Gilson & Lione

(57) ABSTRACT

A container holder for receiving and securing a container is provided. In a preferred embodiment, the container holder comprises a base surface, at least one moldline structure unit, and a sensor. The sensor detects the presence of the container in the holder and induces deformation in the moldline structure unit such that the container is secured in the holder.

20 Claims, 2 Drawing Sheets

CONTAINER HOLDER THAT UTILIZES MOLDLINE STRUCTURES

REFERENCE TO PREVIOUS APPLICATION

This application claims the benefit of U.S. Provisional Application No. 60/218,493 filed on Jul. 14, 2000.

FIELD OF THE INVENTION

The present invention relates generally to the field of container holders. More particularly, the present invention relates to container holders for use in motor vehicles.

BACKGROUND OF THE INVENTION

Continuous moldline technology provides a continuous, smooth surface that can deform or stretch in a selective manner. This technology has been used in aircraft surfaces to reduce turbulence and drag due to gaps and discontinuities that arise in aircraft control surfaces upon movement of the surface. Individual moldline structure units provide distinct flexible surfaces that can be selectively activated to deform.

Motor vehicles frequently contain container holders that allow an occupant of the vehicle to secure a container, such as a beverage container, while the vehicle is in motion. A variety of these container holders have been proposed, but problems remain in the art. For example, due to their rigid structure, some molded container holders accept only containers of a specific size or range of sizes.

SUMMARY OF THE INVENTION

The present invention provides a container holder that is able to receive and secure a wide variety of container sizes and configurations by utilizing an active grasping system enabled by moldline units. The container holder incorporates one or more moldline structure units that deform to a point at which the container is secured. In a preferred embodiment, a container holder according to the present invention comprises a base for supporting the container, one or more moldline structure units that have flexible rods that can deform to a point at which an inserted container can be secured, and a sensor that detects the presence of a container on the base and activates an actuator of the moldline structure(s). The flexible rods of the moldline structure units can be adapted to heat and/or cool a container in the container holder.

BRIEF DESCRIPTION OF THE DRAWINGS

FIG. 2 illustrates a top view of a container holder in accordance with a first preferred embodiment of the present invention.

FIG. 3 presents a cross-sectional view of the container holder illustrated in FIG. 2.

FIG. 4 illustrates a top view of a container holder in accordance with a second preferred embodiment of the present invention.

FIG. 5 presents a cross-sectional view of the container holder illustrated in FIG. 4.

DETAILED DESCRIPTION OF THE PREFERRED EMBODIMENTS OF THE INVENTION

The following description of preferred embodiments provide examples of the present invention. The embodiments discussed herein are merely exemplary in nature, and are not intended to limit the scope of the invention in any manner. Rather, the description of these preferred embodiments serves to enable a person of ordinary skill in the relevant art to make and use the present invention.

Figure 1:
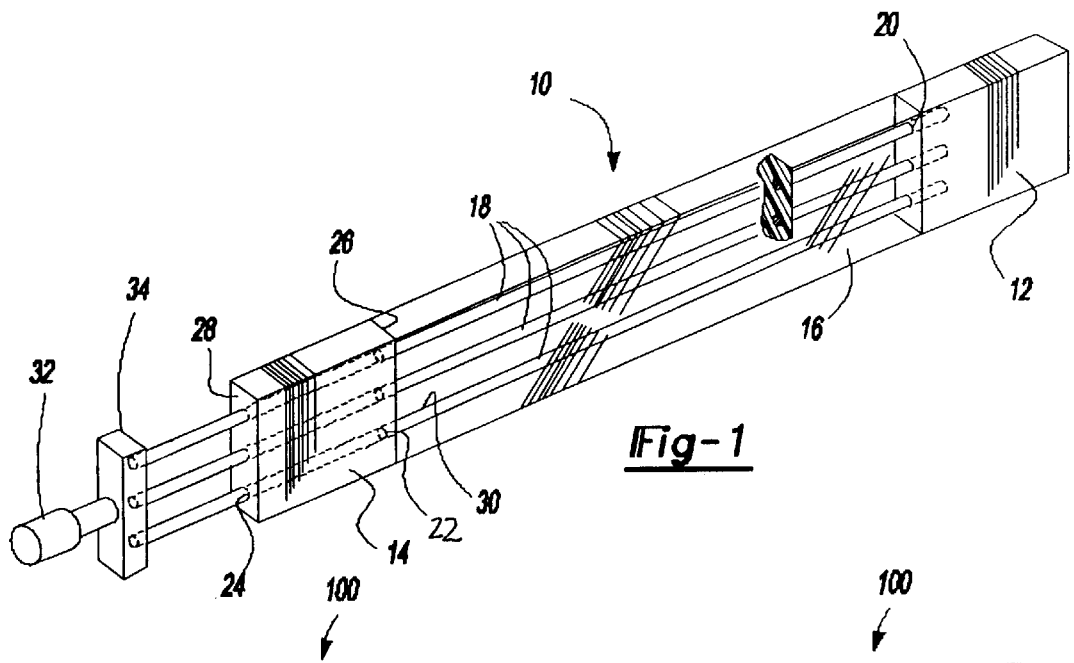
FIG. 1 illustrates a perspective view of a moldline structure unit for incorporation into a container holder according to the present invention.

FIG. 1 illustrates an example of a moldline structure unit 10 that can be utilized in the present invention. The unit 10 includes a base member 12, a guide member 14, and a flexible panel 16 extending between the base 12 and guide 14 members. One or more flexible rods 18 extend through the flexible panel 16 and into both the base 12 and guide 14 members. The base 12 and guide 14 members are preferably secured to a surface, such as a surface of a vehicle console.

The base member 12 preferably defines one or more openings 20 that receive and retain one end of the rods 18. In the base member 12, the openings 20 preferably retain the rods 18 such that the rod 18 cannot move within the opening 20. The rod 18 may be secured in the opening 20 by any of a variety of means, including an adhesive bond between the rod 18 and block 12, mechanical attachment, such as crimping or by way of a fastener, etc. Alternatively, the rod 18 can be secured to a face of the base member 12.

The guide member 14 defines openings 22 that provide a passageway 24 from a first face 26 to an opposing second face 28 of the member 14. Each opening 22 receives a second end of a rod 18 and allows the rod 18 to move freely through the passageway 24. Preferably, a free end of each rod 18 extends past the second edge 28 so that the flexible panel 16 can be deformed by passing a portion of the free end into the passageway 24, as will be developed more fully below.

The flexible panel 16 preferably comprises a flexible polymeric material that surrounds the portion of the rods 18 that lies between the end blocks 12, 14. Particularly preferable, the flexible panel 16 comprises an elastomeric material. Alternatively, the flexible panel can comprise any flexible material that is able to stretch or deform to a desired degree and return to its original form. The appropriate degree of ability to deform will depend on the application. For applications of the present invention, the flexible panel 16 is preferably capable of stretching to 150% of its normal length and still be able to return to its original length and form. Examples of suitable materials for use in the flexible panel of the present invention include rubber, silicones, silicone rubbers, polyurethanes, and flexible acrylics.

The flexible panel 16 defines one or more cavities 30 that receive the rods 18. Preferably, the flexible panel 16 defines one cavity 30 for each rod 18. Alternatively, the flexible panel may define a single, relatively large cavity that receives a plurality or all of the rods 18. The cavities 30 receive the rods 18 in a manner that allows the rods 18 to move within the cavities 30. That is, the flexible panel 16 is preferably able to slide over the rods 18, via the cavities 30, as the rods 18 are pushed or pulled into or out of the cavities 30.

The rods 18 are also flexible in nature. Preferably, the rods comprise a composite material that is sufficiently flexible to allow the flexible panel 16 to stretch to its full capacity. Also preferable, the rods 18 are able to bend and/or deform in a manner that confers a smooth, continuous shape to the flexible panel 16. Composite materials, such as carbon fiber and polymeric materials, provide the desired flexibility when acted upon by an external mechanical force, such as a pushing or pulling action, which will be developed more fully below. As an alternative to composite materials, the rods 18 can comprise any material that possesses the desired flexibility. Examples of suitable alternative materials for use in the rods of the present invention include aluminum, steel, and alloyed iron.

The rods 18 preferably comprise elongate, cylindrical shaped members that can be secured to the base member 12 and can be threaded through the passageway(s) 24 of the guide member 14 and the cavity(ies) 30 of the flexible panel 16. Alternatively, any other suitable shape, such as the flexible plates described in U.S. Pat. No. 5,810,291 to Geiger, et al., for a CONTINUOUS MOLDLINE TECHNOLOGY SYSTEM, which is hereby incorporated by reference in its entirety, can be utilized. Also alternatively, a series of individual rods positioned in parallel or twisted together can be utilized. Of course, the shape of the passageway(s) 24 and cavity(ies) 30 is preferably complimentary to that of the rods 18 such that the desired flexibility can be achieved.

The unit 10 also preferably includes an actuator 32. The actuator 32 is a device capable of inducing stretching of the flexible panel 16 and the rods 18. The type of actuator used will depend on the nature of the rods 18. For example, a mechanical actuator can be utilized to push or pull the rods 18 such that the desired stretching is achieved. The actuator 32 preferably comprises a motor or other mechanical device. Particularly preferred, the actuator 32 is a motor having a cam 34 that can induce stretching in the rods 18. Alternatively, any other suitable actuator that can induce stretching can be utilized, such as actuators employing hydraulic, pneumatic, or electrical means of inducing movement.

The actuator 32 can interact with the unit 10 to achieve the desired stretching in a variety of ways. For example, the actuator 32 can be attached to the free end of each rod 18 such that the actuator 32 can push or pull the rod 18 into or out of the passageways 24 and cavities 30. Alternatively, the cam 34 can be positioned such that it pushes or pulls the rod 18, either at the free end or at another location along its length, such that the rod 18 and flexible panel 16 stretch. Also, it is preferred that the actuator 32 be able to induce stretching in all rods present in the unit 10. Alternatively, the actuator 32 may induce stretching in only one rod, or a subset of rods.

Figures 2A, 2B:
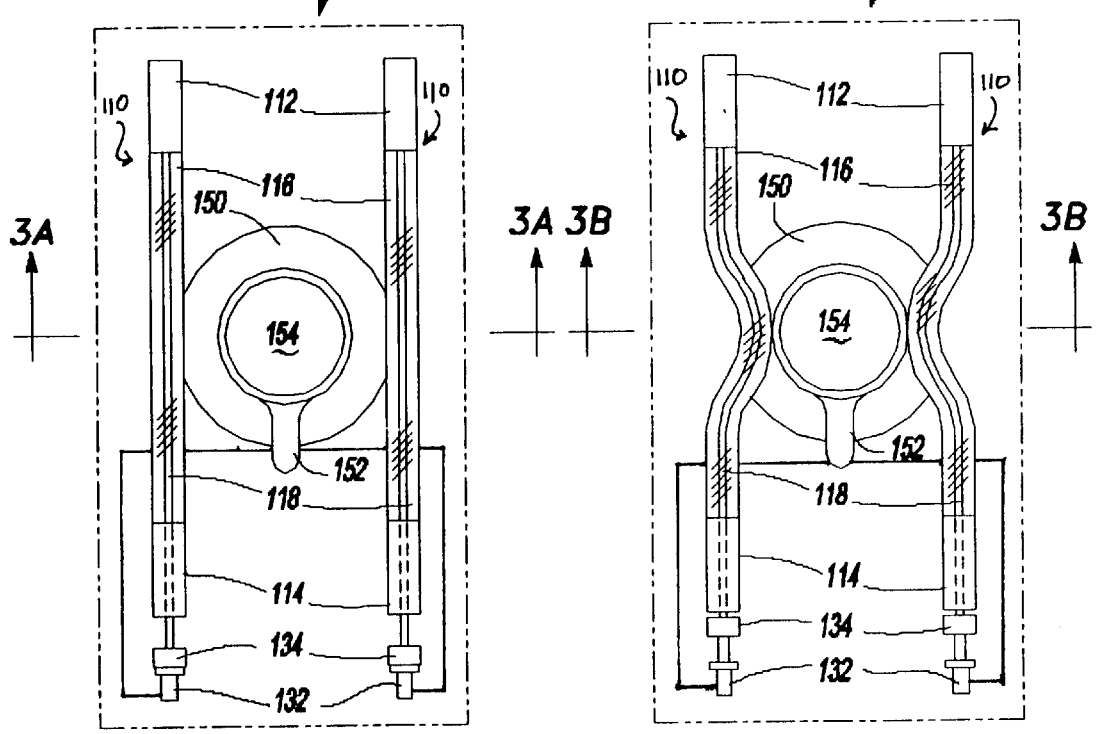
FIG. 2A illustrates a container holder in a relaxed, or non-activated configuration.
FIG. 2B illustrates a container holder in an activated configuration.
Figures 3A, 3B:
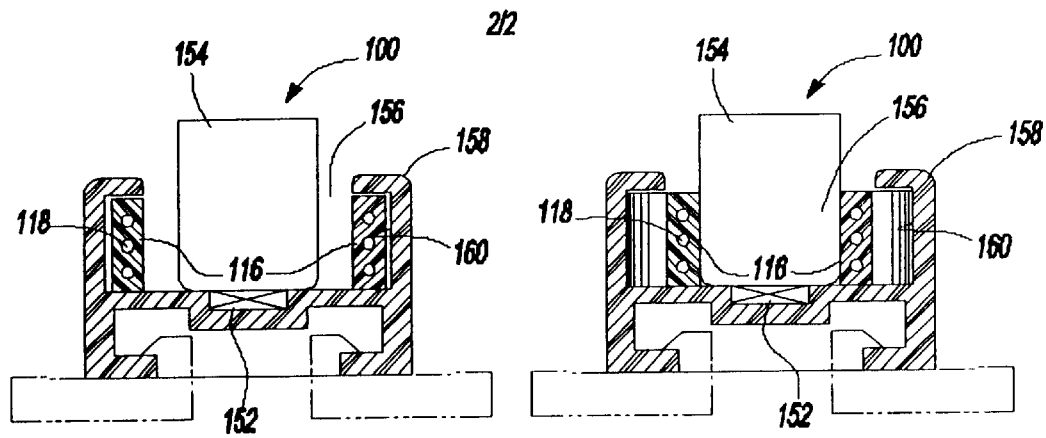
FIG. 3A represents a cross-section taken along line 3A—3A in FIG. 2A.
FIG. 3B represents a cross-section taken along line 3B—3B in FIG. 2B.

FIGS. 2 and 3 illustrate a preferred embodiment of a cupholder 100 in accordance with the present invention. Like reference numbers in these figures refer to similar features and/or components illustrated in FIG. 1. In both FIGS. 2 and 3, panel A illustrates a cupholder in a relaxed, or non-activated configuration, while panel B illustrates a cupholder in an activated configuration. As used herein., activated refers to a state in which a moldline structure unit is stretched to a point at which it secures a container placed in the holder.

As illustrated in the figures, the cupholder 100 preferably incorporates two moldline units 110. The moldline units 110 preferably include a single flexible rod 118 and an actuator 132 connected at the free end of the rod 118 such that the desired stretching is induced by the actuator 132 pushing or pulling on the free end of the rod 118. Alternatively, as discussed above, the actuator 132 can interact with the unit 110 by pushing or pulling the rod 118 at another point along its length. Furthermore, the actuator 132 can further comprise a heating, and/or cooling element capable of heating and/or cooling the rod and/or flexible panel. The use of this type of actuator is appropriate if a heating and/or cooling-function is desired. It should be noted that the flexible panel 116 can be eliminated such that the rods 118 directly grasp the container 154.

In addition to the moldline units 110, the cupholder 100 comprises a base 150 and a sensor 152. The base 150 provides a surface on which a beverage container 154 or other suitable object can be supported. Preferably, as illustrated in the figure, the base 150 comprises a lower surface of a recess 156 in a vehicle console 158, such as an instrument panel, arm rest, interior door panel, fold-down tray, or between-the-seats console. Alternatively, the base 150 can comprise any surface suitable for supporting the container 154 or object.

As shown in the figures, the console also preferably defines pockets 160 that house the moldline units 110. The pockets help to ensure that stretching of the rod 118 and flexible panel 116 occurs in only a single direction.

The sensor 152 is preferably capable of detecting the presence of an object on the base 150. Particularly preferable, the sensor 152 is a sensor capable of detecting the presence of typical beverage containers, such as aluminum cans, paper cups, and glass bottles, on the base 150. Suitable sensors include optical sensors that detect the presence of an object by disruption of a light path, and weight or mass sensors. Preferably, as illustrated in the figures, the sensor 152 comprises a weight or mass sensor that is positioned below the base 150 and detects the presence of container 154 by sensing the application of a mass to the base 150.

The sensor 152 is operably connected to the actuators 132 of the moldline units 110. As such, the sensor 152 triggers the actuator 132 to induce stretching of the rods 118 and flexible panel 116 upon detection of the presence of an object on the base 150. In a preferred embodiment, best illustrated in FIGS. 2A and 2B, the sensor 152 is connected to the actuators 132 such that, when the sensor 152 detects the presence of an object on the base 150, the actuators 132 induce stretching of the rods 118. Preferably, the stretching is directed toward the detected object, such as container 154, until sufficient resistance is detected. The stretching is preferably stopped at point at which the container 154 is secured, i.e., preferably a point that allows easy removal and replacement of the container 154 while still providing support to the container 154 sufficient to avoid tipping.

As an alternative to the sensor, the container holder can include a mechanical or electrical activator, such as a button, slider control, or other activation device that allows an occupant of the vehicle to manually initiate stretching of the rods.

The moldline structure unit can be adapted to provide heating and/or cooling to the container in the holder. For example, the rods can be made of a resistive material that warms when an electrical current is sent through the rod. Alternatively, any suitable method or apparatus for heating or cooling the rods can be utilized.

Figures 4A, 4B:
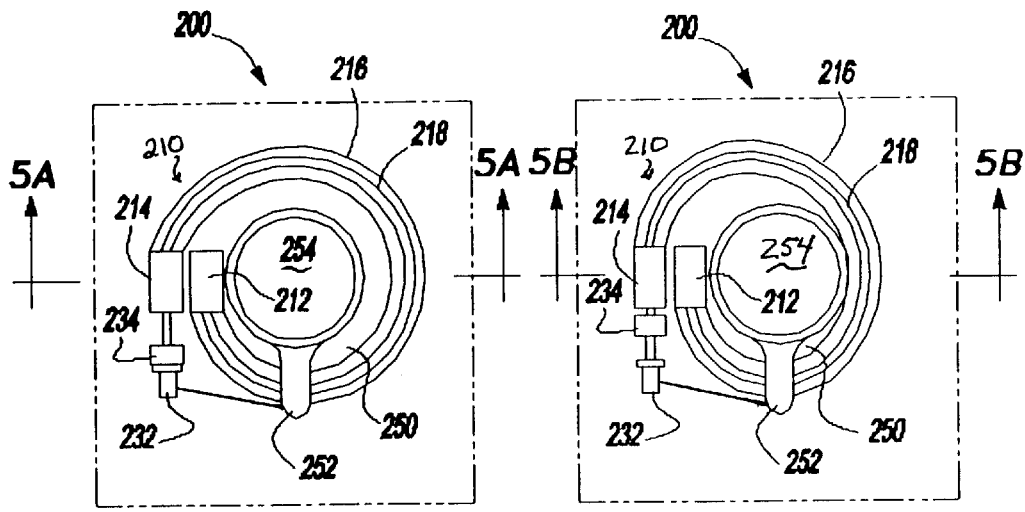
FIG. 4A illustrates a container holder in a relaxed, or non-activated configuration.
FIG. 4B illustrates a container holder in an activated configuration.
Figures 5A, 5B:
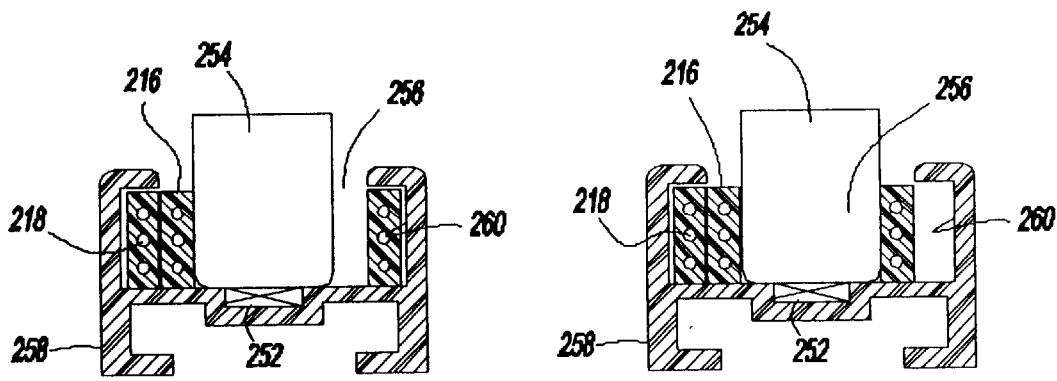
FIG. 5A represents a cross-section taken along line 5A—5A in FIG. 4A.
FIG. 5B represents a cross-section taken along line 5B—5B in FIG. 4B.

FIGS. 4 and 5 illustrate a second preferred embodiment of the present invention. Again, in both figures, panel A illustrates a cupholder 200 in a relaxed, or non-activated configuration, while panel B illustrates the cupholder 200 in an activated configuration. Also, like reference numbers refer to similar features and/or components illustrated in the previous figures. This embodiment is similar to the preferred embodiment detailed above except as discussed below.

In this embodiment, the actuator 232 is connected to the rod 218 in a manner that allows the actuator 232 to induce stretching by pulling the rod 218. Furthermore, a single moldline unit 210 that encircles an area of the base 250 is used. As a consequence, upon pulling by the actuator 232, the circle formed by the unit 210 shrinks, and the container 254 is eventually secured by the unit 210.

While the illustrated embodiments demonstrate the use of one and two moldline units, it will be appreciated that any suitable number of moldline units can be incorporated into the present invention. Also, it will be recognized that any suitable size and/or shape of recess and/or base can be utilized. Furthermore, while the present invention has been illustrated as a container holder appropriate for securing beverage containers in a vehicle, it will be appreciated that the present invention can be used to secure a variety of containers and/or other objects in any suitable environment.

The foregoing disclosure represents the best mode devised by the inventors for practicing the invention. It is apparent, however, that several variations in the container holders of the present invention may be conceivable by one skilled in the art. Inasmuch as the foregoing disclosure is intended to enable such person to practice the instant invention, it should not be construed to be limited thereby, but should be construed to include such aforementioned variations.

We claim:

1. A container holder for receiving and temporarily securing a container, said container holder comprising:
   a base surface for supporting said container;
   a moldline structure unit, comprising at least one flexible rod, having first and second ends, a base member, and a guide member having first and second opposing faces and defining a passageway extending between the first and second opposing faces, the first end of the rod being fixedly attached to the base member and the second end of the rod being disposed in the passageway and being capable of slideable movement within the passageway, a flexible panel disposed around the rod and between the base and guide members, and an actuator adapted to induce deformation of the rod and flexible panel by causing the second end of the rod to move with respect to the passageway; and
   a sensor adapted to detect the presence of said container on the base surface and operably connected to the actuator such that the sensor is able to activate the actuator to induce deformation of the rod and flexible panel to a point at which said container is secured in said container holder.

2. A container holder in accordance with claim 1, wherein the base comprises a bottom surface of a recess defined by a vehicle console.

3. A container holder in accordance with claim 1, wherein the actuator comprises a mechanical actuator attached to the second end of the rod and adapted to selectively push or pull the second end of the rod with respect to the passageway in order to induce deformation of the rod.

4. A container holder in accordance with claim 1, wherein the sensor comprises a weight or mass sensor.

5. A container holder in accordance with claim 1, wherein the moldline structure unit is positioned in a manner such that the rod and flexible panel encircle said container when said container is placed in said container holder.

6. A container holder in accordance with claim 1, further comprising a second moldline structure unit having a second actuator, wherein the sensor is further operably connected to the second actuator such that the sensor is able to activate the first and second actuators to induce deformation in the first and second moldline structure units.

7. A container holder in accordance with claim 6, wherein the second moldline structure unit is positioned directly opposite the first moldline structure unit.

8. A container holder in accordance with claim 7, wherein the sensor is positioned between the first and second moldline structure units.

9. A container holder in accordance with claim 1, wherein the moldline structure unit is adapted to heat said container when secured by the moldline structure unit.

10. A container holder in accordance with claim 1, wherein the moldline structure unit is adapted to cool said container when secured by the moldline structure unit.

11. A vehicle console adapted to receive and temporarily secure a container, said console comprising:
    a main surface defining a recess having a base surface and a side wall, the base surface adapted to support said container; and
    a moldline structure unit disposed adjacent the side wall, the unit comprising at least one flexible rod having first and second ends, a base member, and a guide member having first and second opposing faces and defining a passageway extending between the first and second opposing faces, the first end of the rod being fixedly attached to the base member and the second end of the rod being disposed in the passageway and being capable of slideable movement within the passageway, a flexible panel disposed around the rod and between the base and guide members, and an actuator adapted to induce deformation of the rod and flexible panel to a point at which said container is secured in the recess.

12. A vehicle console in accordance with claim 11, further comprising a sensor adapted to detect the presence of said container on the base surface and operably connected to the actuator such that the sensor is able to activate the actuator to induce deformation of the rod and flexible panel.

13. A vehicle console in accordance with claim 12, wherein the sensor comprises a weight or mass sensor.

14. A vehicle console in accordance with claim 12, further comprising a second moldline structure unit having a second actuator, wherein the sensor is further operably connected to the second actuator such that the sensor is able to activate the first and second actuators to induce deformation in the first and second moldline structure units.

15. A vehicle console in accordance with claim 12, wherein the moldline structure unit is adapted to heat or cool said container when secured by the moldline structure unit.

16. A vehicle console in accordance with claim 12, wherein the side wall defines a pocket adjacent the base and wherein the moldline structure unit is substantially disposed in the pocket.

17. A container holder for receiving and temporarily securing a container, comprising:
    a base surface for supporting said container;
    a moldline structure unit, comprising at least one flexible rod having first and second ends, a base member, and a guide member having first and second opposing faces and defining a passageway extending between the first and second opposing faces, the first end of the rod being fixedly attached to the base member and the second end of the rod being disposed in the passageway and being capable of slideable movement within the passageway; and means for inducing deformation of the flexible rod to a point at which said container is secured in said container holder.

18. A container holder in accordance with claim 17, wherein the moldline structure unit further comprises a flexible panel disposed around the rod and between the base and guide members.

19. A container holder in accordance with claim 17, further comprising means for detecting the presence of said container on the base surface, wherein the means for detecting are adapted to activate the means for inducing deformation.

20. A container holder in accordance with claim 17, further comprising means for heating and cooling the flexible rod such that said container can be heated or cooled when present in said container holder.

* * * * *

UNITED STATES PATENT AND TRADEMARK OFFICE
CERTIFICATE OF CORRECTION

PATENT NO. : 6,547,117 B2
DATED : April 15, 2003
INVENTOR(S) : Andrew Z. Glovatsky et al.

It is certified that error appears in the above-identified patent and that said Letters Patent is hereby corrected as shown below:

<u>Title page,</u>
Item [56], References Cited, U.S. PATENT DOCUMENTS, insert the following:
-- 5,979,828   11/1999   Gruensfelder et al. --.

Signed and Sealed this

Sixteenth Day of September, 2003

JAMES E. ROGAN
*Director of the United States Patent and Trademark Office*